J. COURTNEY.
AUTOMOBILE LOCK.
APPLICATION FILED OCT. 15, 1918.

1,354,172.

Patented Sept. 28, 1920.

WITNESSES
Howard D. Orr.
F. T. Chapman.

John Courtney,
INVENTOR

BY E. G. Siggers.
ATTORNEY

UNITED STATES PATENT OFFICE.

JOHN COURTNEY, OF MARK CENTER, OHIO.

AUTOMOBILE-LOCK.

1,354,172.  Specification of Letters Patent.  Patented Sept. 28, 1920.

Application filed October 15, 1918. Serial No. 258,202.

*To all whom it may concern:*

Be it known that I, JOHN COURTNEY, a citizen of the United States, residing at Mark Center, in the county of Defiance and State of Ohio, have invented a new and useful Automobile-Lock, of which the following is a specification.

This invention has reference to automobile locks, and its object is to provide a lock applicable to the pedals of the Ford type of automobiles.

In the Ford automobile three pedals arranged side by side are provided for the foot control of the vehicle. One pedal has an intermediate neutral position and controls the high and low speed clutches. Another pedal controls the foot brake and a third pedal intermediate of the other two pedals is utilized for controlling the reverse gear.

When the vehicle is at rest the clutch and brake pedals are about opposite each other crosswise of the vehicle, while the reverse pedal is normally nearer to the operator than the first two pedals.

The invention comprises two elongated arms hinged together at one end and capable of being moved toward and from each other so as to be applied about the three pedals when the reverse pedal is pushed forwardly against its normal tendency so that the three pedals are then in line crosswise of the machine. One arm is longer than the other and both arms at the free ends terminate in eyes with the eye of the shorter arm carrying a link capable of being passed over the eye of the longer arm when the two arms straddle the three pedals. Then by applying a padlock or other suitable lock to the eye of the longer arm the link is secured so that it cannot then leave the longer arm, and consequently the three pedals are effectively held against manipulation and the vehicle cannot be driven under its own power.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claim.

In the drawing:—

Figure 1:
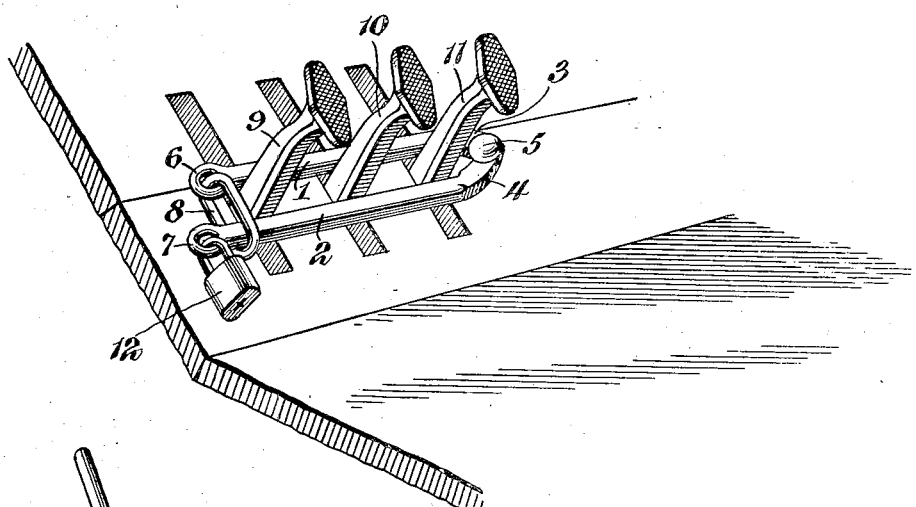
Figure 1 is a perspective view of the lock in locking position.

Referring to the drawing, there are shown two elongated arms 1 and 2, respectively. These arms are or may be straight for the greater portion of their length and each arm near one end terminates in a curve 3, 4, respectively, and the two arms are there joined by a hinge 5, which latter may be of any suitable character or construction and requires no special description further than that the hinge permits the arms to be moved toward and from each other about the axis of the hinge.

The arm 1 is shorter than the arm 2 and terminates in an eye 6, the arm 2 terminating in an eye 7. The result is that when the arms are closed together the eye 7 projects beyond the eye 6. Secured to the eye 6 is a link 8 of sufficient length to be passed over the eye 7 when the eye ends of the two arms are brought together or sufficiently close together, and when the arms are then spread apart the link limits the separation of the two arms. The link may be such that when the arms are separated as far as permitted by the link they are about parallel one with the other.

In Fig. 1 three pedal levers 9, 10 and 11 are shown. The pedal 9 constitutes what is known as a high and low speed or clutch pedal of the type of automobile to which the invention is applicable. The pedal 10 constitutes the reverse pedal and the pedal 11 constitutes the brake pedal.

Figure 2:
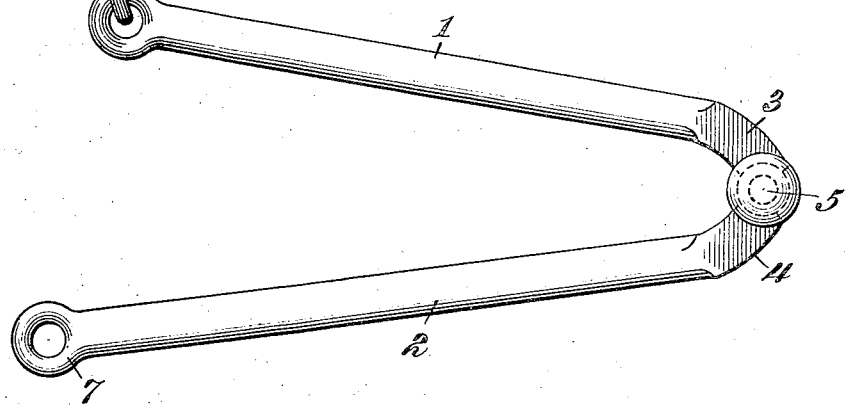
Fig. 2 is an elevation of the lock with the arms spread apart for application to the pedals.

The pedal mechanism is such that when the automobile is parked the pedal lever 9 is at an intermediate position between the high and low speed positions. The pedal lever 11 is in the inactive position constituting the normal position of the lever 11 and is then about opposite the lever 9 in its neutral position. The pedal lever 10, however, is nearer to the operator of the vehicle than either of the other two pedal levers, so that to bring the three pedal levers in line one with the other the pedal lever 10 must be pushed for a suitable distance away from the operator and against its normal tendency to maintain an inactive position. With the levers all in about the same line transversely of the vehicle, the arms 1 and 2 when spread apart, as shown in Fig. 2, are placed in embracing relation to the three levers and then approached one toward the other until the link 8 can be passed over the eye 7 onto the arm 2. In this position the pedal lever 10 may be released and its normal tendency to return to its initial or inactive position causes a spreading of the arms 1 and 2 as far as permitted by the link 8. Now by applying a lock 12, say a padlock, to the eye 7, the link 8 is prevented from escaping from the arm 2 and consequently the lock holds the three levers in about the position shown in Fig. 1, that is, the three levers are held in about one line crosswise of the vehicle.

An automobile of the character for which the lock of the invention is designed must be started on "low" and in order to do this the pedal lever 9 must be pushed away from the operator. Such a movement, if attempted when the lock is in locking position, would result in throwing the reverse and brake into active position, wherefore, the low speed clutch and the reverse clutch would tend to oppose each other and prevent the starting of the vehicle. The lock, therefore, locks the pedals of the vehicle in such a way that there is no possibility of starting the vehicle under its own power, while the lock requires no change whatever of any kind in the vehicle, is easily applied and removed and may be readily stored in the tool box of the vehicle or in any convenient place. If, however, the locked machine must be moved, as in case of a fire or by the police, the lock permits unimpeded pushing of the car, while the steering may be done without the slightest interference. Thus the lock of the present invention permits moving of the vehicle for legitimate reasons, while preventing thieves from carrying out their nefarious purposes.

What is claimed is:—

A locking device for automobiles having three pedals, comprising two elongated arms of different lengths which are straight for the greater portion of their length to engage with both sides of the three pedals and hold the pedals in alinement with each other, each arm near one end terminating in a curve, a hinge connecting the curved ends of the arms, each arm terminating at the unhinged end in an eye, with the arms, eyes and hinge all in substantially the same plane, and a closed link pivotally carried by the eye of the shorter arm and movable over the end of and embracing the longer arm, whereby the two arms may be locked in parallel relation, said device being applied so as to extend loosely along the upper and lower sides of the pedals whereby if one pedal is depressed the other two must move with it.

In testimony that I claim the foregoing as my own, I have hereto affixed my signature.

JOHN COURTNEY.

Witnesses:
E. F. ARMSTRONG,
ROSIE COURTNEY.